Nov. 5, 1963   W. A. HAGGERTY   3,109,270
DRILL GRINDING METHOD
Filed April 22, 1960
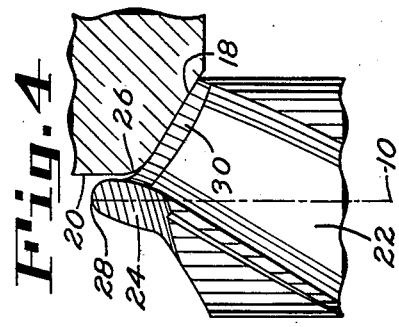
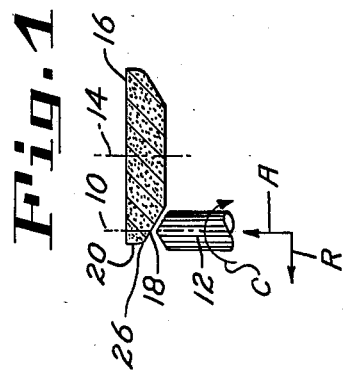
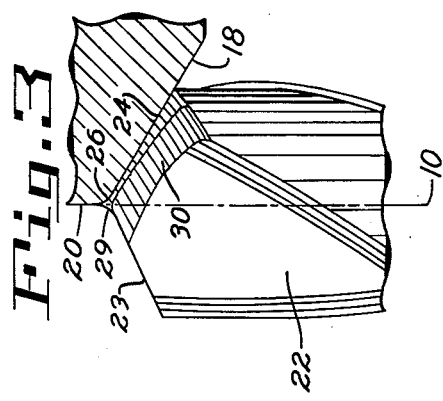
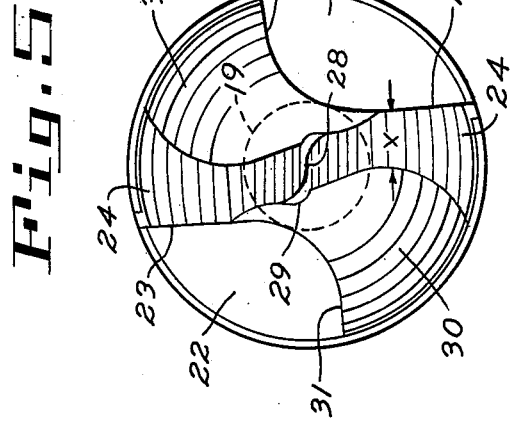
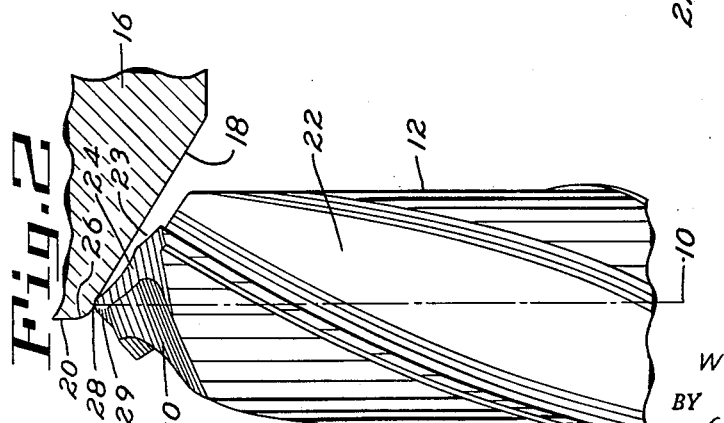
INVENTOR.
WILLIAM A. HAGGERTY
BY
ATTORNEYS

United States Patent Office 3,109,270
Patented Nov. 5, 1963

3,109,270
DRILL GRINDING METHOD
William A. Haggerty, Cincinnati, Ohio, assignor to The Cincinnati Milling Machine Co., Cincinnati, Ohio, a corporation of Ohio
Filed Apr. 22, 1960, Ser. No. 23,996
5 Claims. (Cl. 51—288)

This invention relates to a new and improved method of thinning the webs of twist drills.

Most present day drills are made with tapered webs which increase in thickness toward the shank of the drill. Hence, as material is removed from the end of the drill as an incident to the repointing or sharpening thereof, the web increases in thickness. This increases the central point area of the drill and correspondingly reduces the length of the cutting lips. As a result, the thrust required to force the drill into the work is considerably increased. This causes rapid heating of the drill and shortens its effective life. The improved method of web thinning, which will hereinafter be described, is based upon the novel drill grinding method disclosed and claimed in co-pending patent application Serial No. 685,212 filed September 20, 1957 by Ernst et al. for Method and Apparatus for Grinding Drills, now Patent No. 3,037,329, dated June 5, 1962. The latter application, hereinafter referred to as Ernst et al., is concerned with the method of grinding a spiroidal centering tip or point on the end of a twist drill, and also with a particular form of apparatus for accomplishing the method. In brief, the method therein disclosed consists in providing three simultaneous movements of the drill relative to the grinding wheel while the drill is in contact with the grinding face of the wheel. Assuming a system in which the rotating grinding wheel remains stationary while the drill moves relative thereto, these three simultaneous movements consist of rotation of the drill about its own axis, axial movement of the drill along its axis, and radial or lateral movement of the drill, i.e., movement of the drill perpendicular to its axis. The last two movements, i.e., the axial and radial movements, will combine, of course, into a single resultant movement of the drill along a path which is inclined with respect to its axis. However, for the purpose of analyzing the essential steps of the method, it is helpful to consider each of the three component movements separately.

The point grinding method of the co-pending application also includes the feature of moving the axis of the drill from a point inside the edge of the wheel to a point outside, or beyond, the edge of the wheel, which edge is formed with a small radius to provide the proper configuration to the centering tip of the drill. This movement of the drill axis across the edge of the wheel is effected by the radial movement which takes place simultaneously with the other two movements. The point resulting from the application of this method is provided with a protruding arch or centering tip which is, itself, provided with cutting edges so that it cuts its own chips in addition to those cut by the cutting lips of the drill. As disclosed in Ernst et al., and also as disclosed in Patent 2,903,922 issued September 15, 1959 for Self-Centering Drill, the cutting edges on the tip of the drill are formed by the intersection of two spiroidal surfaces which are generated by the conical spiral path followed by the drill relative to the grinding wheel. The rake and clearance angles of the cutting edges thus formed on the tip portion are such as to provide for the efficient removal of metal in the area lying directly beneath the web of the drill. Hence, the spiral drill point not only provides for a centering action of the drill but also significantly reduces the thrust forces required to feed the drill through the work. Some of this advantage of reduced thrust is lost, however, where the web is abnormally thick because the increased width of the tip results in shorter cutting lips and the space normally provided by the flutes for chip clearance is taken up by the web. Hence, efficient cutting action and chip removal are interfered with and the drilling forces are increased.

It has been found that a very effective and accurate means of web thinning can be effected by employing essentially the same method as that used for grinding the drill point. More specifically, it has been discovered that, using the same setup of the drill relative to the grinding wheel as previously employed in connection with the point grinding operation, but using an abnormally large axial movement of the drill relative to the grinding wheel, it is possible to grind a relief on the heel portion of each of the drill lands which has the effect of thinning the web and improving the rake angles and chip clearance at the center of the drill. The extent of the relief thus provided must, of course, be controlled within limits so as to provide adequate clearance for the chips formed at the center of the drill while at the same time maintaining adequate strength of the lands behind the cutting lips to insure against failure of the drill point during heavy cuts. Such limits are not critical however as will appear hereinafter in connection with the detailed description of the invention.

Accordingly, one of the objects of this invention is to provide a new and improved method of thinning the webs of twist drills.

Another object of the invention is to provide a method of thinning the webs of twist drills which is particularly well suited for use in connection with the method of grinding spiroidal drill points disclosed in Ernst et al.

With these and other objects in view, which will become apparent from the following description, the invention includes certain novel features, the essential elements of which are set forth in the appended claims, and a preferred form or embodiment of which will hereinafter be described with reference to the drawings which accompany and form a part of this specification.

In the drawings:
FIG. 1 is a schematic view showing the position of the drill in relation to the grinding wheel.
FIGS. 2, 3 and 4 show different instantaneous positions of the drill relative to the grinding wheel during the point grinding cycle.
FIG. 5 is an end view of the drill showing the point as it appears after the web thinning operation has been completed.

In the specification to follow, similar reference characters designate similar or identical elements or portions throughout the different views of the drawings.

As hereinbefore indicated, the new method of thinning thick-webbed drills is particularly suited for use in connection with the spiral point drill grinding method shown and described in Ernst et al. to which reference is made for a full disclosure thereof. Ernst et al. also discloses a particular type of grinding machine for carrying out the method though it is to be understood that other forms of grinding equipment might be used to perform the method so long as the relative motions between the wheel and the drill remain the same. Hence, any reference made herein to the machine of Ernst et al. is intended merely by way of example and should not be taken to mean that the present invention is limited to use with only a machine of this particular type.

In FIG. 1 of the accompanying drawings is shown one possible arrangement of the drill relative to the grinding wheel wherein the axis 10 of the drill 12 is disposed parallel to the axis 14 of the grinding wheel 16. The relationship shown in this view is also the same as that shown in FIG. 2 in which a grinding face 18 of the wheel overlies the central portion of the drill. This is the starting position of the grinding cycle.

One method of thinning the web 19 (FIG. 5) by means of the new procedure, is to first grind the point in the regular manner, i.e., as described in Ernst et al. This is done with the lead dial 152 of Ernst et al. set to a position to give a normal or recommended clearance angle for the drill size being ground. The dial is then moved to its position for maximum lead, or axial motion, so as to provide a high clearance angle on the drill. At the same time, the diameter setting dial 132 of Ernst et al. is preferably adjusted for a slightly larger drill size so as to increase the radial motion and thereby provide clearance between the grinding wheel and the tip of the drill when thinning the web. The micrometer adjustment screw 178 of Ernst et al. is then turned in the appropriate direction to move the drill away from the wheel to prevent excessive stock removal due to the high lead set into the machine. Then, after the machine is started, the screw is slowly turned in the opposite direction to feed the drill into the wheel. After grinding begins on the heel of the drill land, slow inward feeding of the drill is continued until a secondary clearance has been ground on the drill as indicated in FIG. 5 by reference numeral 30.

Alternatively, the last operation, i.e., the thinning of the web, may be accomplished first followed by the normal drill grinding operation. This may be advantageous where a number of drills of the same size are to be ground and thinned. If the first drill of the group is ground following the procedure first noted above, then, by using the reverse procedure with the second drill, the dial settings will not need to be changed until after the normal drill pointing operation is performed on the second drill. The third drill may then be inserted and ground using the same procedure as followed for the first drill. Hence, by proceeding in this manner, the dial settings may remain the same for the first part of each drill grinding operation. This reduces the required number of dial setting changes by one half thereby saving the time of the operator in setting up the machine for the several grinds.

FIGS. 2, 3 and 4 of the drawings show the progression of the normal point grinding operation in which a spirally generated point is formed on the end of the drill. In these views, the edge of the grinding face 18, as viewed in profile, may be considered as the active line element of the grinding wheel. It will be noted in FIG. 2, that the edge 20 of the grinding wheel overlies the axis 10 of the drill so that the tip 28 of the drill is ground by the grinding face 18. Also, at the outset of the grinding cycle as shown in FIG. 2, the active line element of the grinding wheel overlies and approximately bisects one of the flutes 22 of the drill. As the grinding cycle proceeds, the motion of the drill relative to the wheel is such that the drill simultaneously moves in the direction of the arrows A, R and C (FIG. 1), which arrows indicate the axial, radial, and rotary movements, respectively, of the drill relative to the wheel. If the wheel is considered to be the moving element with the drill stationary, then the direction of the arrows A, R and C should, of course, be reversed. As the drill moves into the wheel it also moves radially outward so that the grinding of the tip is effected by a small radius 26 dressed on the corner of the wheel. This is best shown in FIG. 3 in which the axis 10 of the drill has moved radially into alignment with the edge 20 of the grinding wheel. As the cycle continues the drill moves still further outward, radially, while also feeding axially in toward the wheel. This is shown in FIG. 4 which illustrates the relative positioning of the drill and grinding wheel near the end of the grind of the normal point on the drill. The same cycle is repeated for the other half of the drill whereby the lands 24 and cutting lips 23 will be formed on the end of the drill together with the arched centering point 28.

To thin the web of the drill according to the new method, the axial motion A (FIG. 1) is increased, preferably by an amount equal to two or three times that normally used for grinding the spiral point. As hereinbefore indicated, the radial motion R (FIG. 1) imparted to the drill is also increased slightly to avoid regrinding of the drill tip. In this regard, it has been found satisfactory to increase the diameter setting of dial 132 by ⅛ the diameter of the drill being ground to prevent regrinding of the tip of the drill during the thinning operation. For example, if a ¼ inch drill is being ground and thinned, the dial 132 is set to ¼ inch during the normal grind of the point and to 9/32 inch during the final or high clearance grind. This amounts to approximately a 10% increase in the radial motion R (FIG. 1). The effect of this increase in the radial motion is seen by the presence of the small surface 29 which is formed during the normal drill pointing operation and permitted to remain on the point after completion of the web-thinning operation. The grinding cycle is now repeated with the drill being fed gradually into the wheel whereupon the rear portion of each land 24 is ground off to form a secondary clearance 30. This secondary grind commences at the rear edge 31 of each land and progresses forwardly toward the cutting lip 23 as the drill is gradually fed into the wheel. Grinding of the secondary clearance is stopped when the dimension X (FIG. 5) is approximately equal to ⅛ the diameter of the drill, this being found to provide an optimum ratio of strength versus cutting efficiency for the new type of thinned drill point.

It is to be noted that in grinding the secondary clearance 30 on the drill point, any increase in lead over that used for grinding the primary clearance 24 is beneficial and reduces the thrust force required to feed the drill into the work. However, as the amount of lead or axial movement is increased, the thrust decreases in a fairly constant proportion to the increased lead until the maximum lead is reached. In the case of a ¼ inch drill, the maximum lead for the particular machine shown and described in Ernst et al. is such as to produce a secondary clearance angle of approximately 25°. This clearance has been found to reduce the thrust required to feed ¼ inch heavy-webbed drills into the work by 50%.

Having thus described the invention in connection with one possible form or embodiment thereof, it is to be understood that the present disclosure is illustrative rather than restrictive and that changes and modifications may be resorted to without departing from the spirit of the invention as defined by the claims which follow.

What is claimed is:

1. The method of thinning the web of a twist drill comprising rotating a grinding wheel having a grinding face about its own axis, effecting a combined axial, radial and rotary movement of the drill relative to the grinding wheel in a continuous and cyclical manner with the end of the drill in contact with the grinding face to generate a point on the end of the drill having a primary clearance angle, thereafter increasing the axial movement to be given the drill relative to the grinding wheel, and repeating the combined axial, radial and rotary movements of the drill relative to the grinding wheel so as to produce a secondary clearance angle on the point of the drill which is substantially greater than the primary clearance angle whereby the web will be ground away and effectively thinned.

2. The method of thinning the web of a twist drill comprising rotating a grinding wheel about its own axis, positioning the drill with the active line element in the grinding face of the grinding wheel intersecting the axis of the drill with one finite end of the element extending a predetermined distance beyond the axis of the drill, effecting a combined axial, radial and rotary movement of the drill relative to the grinding wheel in a continuous and cyclical manner with the end of the drill in contact with the grinding face to generate a point on the end of the drill having a primary clearance angle, the radial movement being such as to move the finite end of the active line element through the drill axis and a predetermined distance therebeyond, increasing the axial movement to be given the drill relative to the grinding wheel, and repeating the combined axial, radial and rotary movement of the drill relative to the grinding wheel so as to produce a secondary clearance angle on the point of the drill which is substantially greater than the primary clearance angle whereby the web will be ground away and effectively thinned.

3. The method of claim 2 wherein the second mentioned radial movement of the drill relative to the grinding wheel is increased by approximately 10% before the second combined axial, radial and rotary movement is effected to produce the secondary clearance angle on the point of the drill.

4. The method of claim 2 wherein the grinding of the secondary clearance angle is continued until the distance between the cutting lip and the secondary clearance angle is equal to approximately ⅛ the diameter of the drill.

5. The method of thinning the web of a twist drill as a part of a drill point grinding operation comprising rotating a grinding wheel having a grinding face about its own axis, positioning the drill with the active line element in the grinding face of the wheel intersecting the axis of the drill with one finite end of the line element extending a predetermined distance beyond the axis of the drill, relatively moving the grinding face and the drill in a direction normal to the axis of the drill to move the finite end through the drill axis and a predetermined amount therebeyond, and simultaneously effecting relative movement between the grinding face and the drill both in a rotary direction about the axis of the drill and also in a direction parallel to the axis of the drill, which movements, in combination with the first-named movement, produce a resultant conical spiral grinding path and thereby cause a conical spiral cutting face having a primary clearance angle to be generated on the end of the drill, thereafter increasing the axial movement to be given the drill in a direction parallel to the axis of the drill, and then continuing the grinding operation to produce a secondary clearance angle on the heel portion of each land which is substantially greater than the primary clearance angle previously formed thereon whereby the web will be ground away and effectively thinned.

References Cited in the file of this patent

UNITED STATES PATENTS

| | | |
|---|---|---|
| 1,931,684 | Aker | Oct. 24, 1933 |
| 2,133,414 | Bahuaud | Oct. 18, 1938 |
| 2,246,865 | Stimson | June 24, 1941 |
| 2,903,922 | Ernst et al. | Sept. 15, 1959 |
| 2,936,658 | Riley | May 17, 1960 |
| 3,037,329 | Ernst et al. | June 5, 1962 |